United States Patent
Chang (10) Patent No.: US 10,114,509 B2
(45) Date of Patent: Oct. 30, 2018

(54) MULTI-TOUCH DEVICE HAVING IMPEDANCES POSITIONED AT ELECTRODE CROSS POINTS AND OPERATION METHOD THEREFOR FOR DETECTING TOUCH INPUTS

(71) Applicant: Wook Chang, Gangnam-gu Seoul (KR)

(72) Inventor: Wook Chang, Gangnam-gu Seoul (KR)

(73) Assignee: Wook Chang, Gangnam-gu, Seoul (KR)

( * ) Notice: Subject to any disclaimer, the term of this patent is extended or adjusted under 35 U.S.C. 154(b) by 0 days.

(21) Appl. No.: 15/512,297

(22) PCT Filed: Aug. 12, 2015

(86) PCT No.: PCT/KR2015/008448
§ 371 (c)(1),
(2) Date: Mar. 17, 2017

(87) PCT Pub. No.: WO2016/043434
PCT Pub. Date: Mar. 24, 2016

(65) Prior Publication Data
US 2017/0277354 A1    Sep. 28, 2017

(30) Foreign Application Priority Data

Sep. 18, 2014 (KR) .................. 10-2014-0124396

(51) Int. Cl.
*G06F 3/041* (2006.01)
*G06F 3/044* (2006.01)
*G06F 3/045* (2006.01)

(52) U.S. Cl.
CPC ............ *G06F 3/0418* (2013.01); *G06F 3/044* (2013.01); *G06F 3/045* (2013.01); *G06F 2203/04104* (2013.01)

(58) Field of Classification Search
CPC ........ G06F 3/045; G06F 3/044; G06F 3/0418; G06F 2203/04104
See application file for complete search history.

(56) References Cited

U.S. PATENT DOCUMENTS

2009/0224776 A1*  9/2009  Keith .................. H03K 17/962
                                                    324/686
2010/0073323 A1*  3/2010  Geaghan ................ G06F 3/044
                                                    345/174
(Continued)

FOREIGN PATENT DOCUMENTS

JP    2009015489 A    1/2009
JP    2012221220 A    11/2012
(Continued)

OTHER PUBLICATIONS

International Search Report for International Application No. PCT/KR2015/008448 dated Nov. 24, 2015, 5 pages.
(Continued)

*Primary Examiner* — Kwang-Su Yang
(74) *Attorney, Agent, or Firm* — TraskBritt (57) ABSTRACT

A multi-touch device detecting a touch input by using a passive element comprises a plurality of driving electrodes; a plurality of detection electrodes; a plurality of impedances positioned at an intersecting point of the plurality of driving electrodes and the plurality of detection electrodes; and a control unit selecting a first driving electrode and a first detection electrode from the plurality of driving electrodes and the plurality of detection electrodes, outputting a first voltage on the first driving electrode, outputting a second voltage on at least one of the remaining driving electrodes and at least one of the remaining detection electrodes, and detecting a touch input on a first intersecting point of the first driving electrode and the first detection electrode on the
(Continued)

basis of a detection voltage detected from the first detection electrode.

11 Claims, 5 Drawing Sheets

(56) References Cited

U.S. PATENT DOCUMENTS

| | | | | |
|---|---|---|---|---|
| 2011/0115733 A1* | 5/2011 | Shih | ............... | G06F 3/0412 345/173 |
| 2014/0022201 A1* | 1/2014 | Boychuk | ............ | G06F 3/041 345/174 |
| 2015/0177898 A1* | 6/2015 | Hirata | ............... | G06F 3/0414 345/173 |
| 2015/0185941 A1* | 7/2015 | Lee | ............... | G06F 3/0412 345/173 |

FOREIGN PATENT DOCUMENTS

| | | |
|---|---|---|
| JP | 2014106070 A | 6/2014 |
| KR | 20140037847 A | 3/2014 |
| KR | 20140110761 A | 9/2014 |
| WO | 2012141131 A1 | 10/2012 |

OTHER PUBLICATIONS

International Written Opinion for International Application No. PCT/KR2015/008448 dated Nov. 24, 2015, 4 pages.

\* cited by examiner

# MULTI-TOUCH DEVICE HAVING IMPEDANCES POSITIONED AT ELECTRODE CROSS POINTS AND OPERATION METHOD THEREFOR FOR DETECTING TOUCH INPUTS

CROSS-REFERENCE TO RELATED APPLICATIONS

This application is a national phase entry under 35 U.S.C. § 371 of International Patent Application PCT/KR2015/008448, filed Aug. 12, 2015, designating the United States of America and published as International Patent Publication WO 2016/043434 A1 on Mar. 24, 2016, which claims the benefit under Article 8 of the Patent Cooperation Treaty to Korean Patent Application Serial No. 10-2014-0124396, filed Sep. 18, 2014.

TECHNICAL FIELD

One or more example embodiments relate to a multi-touch apparatus and an operating method thereof.

BACKGROUND

Recently, a multi-touch apparatus for providing an intuitive environment for various devices using an interface device has been used. In general, the multi-touch apparatus includes a touch panel in which a drive electrode and a sense electrode cross.

The multi-touch apparatus may use a resistive sensing method and a capacitive sensing method based on a type of impedance to be used to recognize a touch input. The capacitive sensing method may recognize the touch input based on a change in a capacitance accumulated in a capacitor caused by the touch input. The resistive sensing method may recognize the touch input based on a resistance value that is changed by a pressure caused by the touch input.

For example, Korean Patent Laid-Open Publication No. 10-2014-0037847 discloses a multi-touch apparatus for sensing a pressure. The multi-touch apparatus of Korean Patent Laid-Open Publication No. 10-2014-0037847 senses a pressure caused by a touch input based on a matrix of pressure-sensing cells.

The multi-touch apparatus of Korean Patent Laid-Open Publication No. 10-2014-0037847 or a currently provided multi-touch apparatus may use a single-chip controller manufactured by an on-demand manufacturing process or a number of active elements and a general controller. Using an on-demand controller or an active element may increase the cost of producing the multi-touch apparatus.

Thus, there is need for a multi-touch apparatus that precisely recognizes a touch input and uses a general controller and passive element, which is less costly to produce.

BRIEF SUMMARY

Technical Goals

One aspect of the disclosure provides a multi-touch apparatus that accurately recognizes a touch input using a general controller and a passive element.

Technical Solutions

According to another aspect of the disclosure, there is provided a multi-touch apparatus including a plurality of drive electrodes, a plurality of sense electrodes, a plurality of impedances positioned at cross points of the drive electrodes and the sense electrodes, and a controller configured to select a first drive electrode from the drive electrodes, select a first sense electrode from the sense electrodes, output a first voltage to the first drive electrode, output a second voltage to at least one of the remaining drive electrodes and at least one of the remaining sense electrodes, detect a touch input associated with a first cross point of the first drive electrode and the first sense electrode based on a detection voltage detected from the first sense electrode.

According to another aspect of the disclosure, there is provided a control apparatus for a multi-touch panel including N output ports connected to N drive electrodes of the multi-touch panel, M general ports connected to M sense electrodes of the multi-touch panel, and a processor configured to select a first output port from the N output ports, select a first general port from the M general ports, output a first voltage to the first output port, output a second voltage to at least one of the remaining output ports and at least one of the remaining general ports, and detect a touch input associated with a first cross point of a first drive electrode among the N drive electrodes and a first sense electrode among the M sense electrodes based on a detection voltage detected from the first general port, the first drive electrode connected to the first output port and the first sense electrode connected to the first general port.

According to still another aspect of the disclosure, there is provided an operating method of a multi-touch apparatus including selecting a first drive electrode from a plurality of drive electrodes and selecting a first sense electrode from a plurality of sense electrodes, outputting a first voltage to the first drive electrode, outputting a second voltage to at least one of the remaining drive electrodes, outputting the second voltage to at least one of the remaining sense electrodes, and detecting a touch input associated with a first cross point of the first drive electrode and the first sense electrode based on a detection voltage detected from the first sense electrode.

Effect

According to example embodiments, a cost of producing a multi-touch apparatus may be reduced.

According to other example embodiments, it is possible to remove a "ghost" touch with respect to various forms of touch inputs.

Also, according to other example embodiments, the multi-touch apparatus may accurately recognize a touch level and a touch event.

In addition, according to other example embodiments, the multi-touch apparatus may reduce an amount of operation using a simple equation.

According to other example embodiments, the multi-touch apparatus may accurately and rapidly detect a touch input.

DETAILED DESCRIPTION

The present inventive concept will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/."

It will be understood that, although the terms "first," "second," etc., may be used herein to describe various elements, these elements should not be limited by these terms. These terms are only used to distinguish one element from another. For example, a first signal could be termed a second signal and, similarly, a second signal could be termed a first signal without departing from the teachings of the disclosure.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including," when used in this disclosure, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention may pertain. It will be further understood that all terms, such as those defined in commonly used dictionaries, should be interpreted as having a meaning that is consistent with their meaning in the context of the relevant art and/or the present disclosure, and will not be interpreted in an idealized or overly formal sense unless expressly so defined herein.

Figure 1:
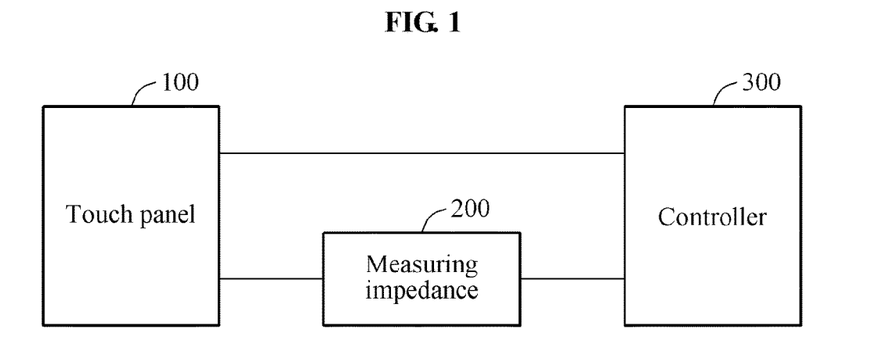
FIG. 1 is a block diagram illustrating a multi-touch apparatus according to an example embodiment.

FIG. 1 is a block diagram illustrating a multi-touch apparatus according to an example embodiment.

Referring to FIG. 1, the multi-touch apparatus includes a touch panel 100, a measuring impedance 200, and a controller 300.

The touch panel 100 receives a touch input from a user. The touch panel 100 includes a drive electrode and a sense electrode having a lattice structure. A change in impedance may occur at a cross point of the drive electrode and the sense electrode based on the touch input of the user with respect to the touch panel 100. The controller 300 detects the touch input of the user based on the change in the impedance occurring at the cross point. Detailed description of a structure of the touch panel 100 will be provided with reference to FIG. 2.

The measuring impedance 200 is used to measure the change in the impedance occurring at the cross point by the controller 300. The measuring impedance 200 may include a passive element only. For example, the measuring impedance 200 includes a resistor or a capacitor. Thus, the cost of producing the multi-touch apparatus of the present disclosure may be lower than that of the general multi-touch apparatus including an active element.

The controller 300 detects the touch input of a user based on the change in the impedance occurring at the cross point. The controller 300 may be a micro control unit (MCU). The controller 300 may sense the change in the impedance occurring at the cross point based on a detection voltage of the sense electrode. Also, the controller 300 may measure an accurate value of a cross point impedance based on an interference removal algorithm. The value of the cross point impedance may be used to measure a touch level.

The multi-touch apparatus may use a capacitive sensing method and a resistive sensing method based on a type of impedance to be measured.

The capacitive sensing method may recognize a minute current to be propagated through the drive electrode using the sense electrode. With the capacitive sensing method, the minute current emitted from the drive electrode may be interrupted when a user touches the touch panel 100 using a conductor, for example, a finger. The controller 300 may measure the touch input of the user based on a change in capacitance detected through the sense electrode.

The resistive sensing method may use a material that allows a resistance to be changed based on a pressure between the drive electrode and the sense electrode. When the user touches the touch panel 100 using a predetermined object, a resistance occurring between the drive electrode and the sense electrode may be changed based on a change in pressure. The controller 300 may measure the touch input based on the change in resistance detected through the sense electrode.

Figure 2:
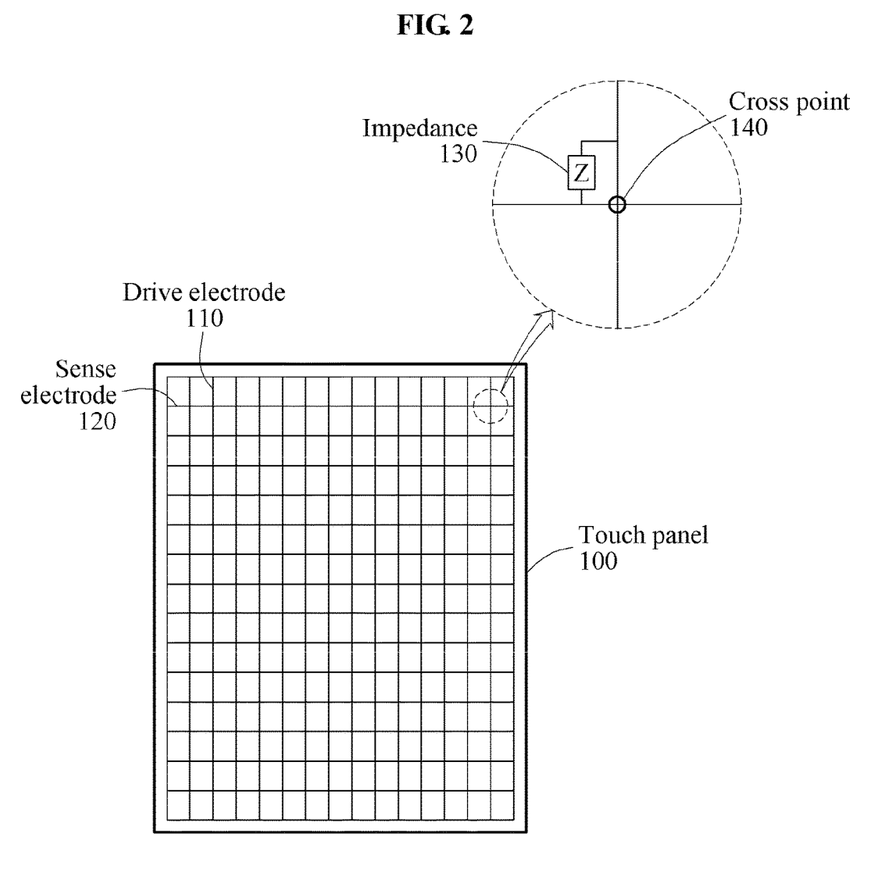
FIG. 2 illustrates a structure of a touch panel according to an example embodiment.

FIG. 2 illustrates a structure of a touch panel according to an example embodiment.

FIG. 2 illustrates a drive electrode 110, a sense electrode 120, an impedance 130, and a cross point 140 of the touch panel 100.

The drive electrode 110 transfers a driving voltage to the impedance 130 and the sense electrode 120. The drive electrode 110 may be connected to an output port of a micro control unit (MCU).

The sense electrode 120 transfers a detection voltage associated with a change in an impedance value of the impedance 130 to the MCU. The sense electrode 120 may be connected to a general port of the MCU. The general port would be a general purpose input/output port.

The drive electrode 110 and the sense electrode 120 have a lattice structure. Although the drive electrode 110 is vertically disposed and the sense electrode 120 is horizontally disposed, the drive electrode 110 may be horizontally disposed and the sense electrode 120 may be vertically disposed. In addition, the drive electrode 110 and the sense electrode 120 may have various forms of structures in which the drive electrode 110 and the sense electrode 120 cross each other.

The impedance 130 is positioned at the cross point 140 of the drive electrode 110 and the sense electrode 120. The impedance 130 may include a resistor or a capacitor. In detail, the impedance 130 may include the resistor when a resistive sensing method is used. The impedance 130 may include the capacitor when a capacitive sensing method is used. A touch input associated with the cross point 140 is detected based on the change in the impedance value of the impedance 130.

Figure 3:
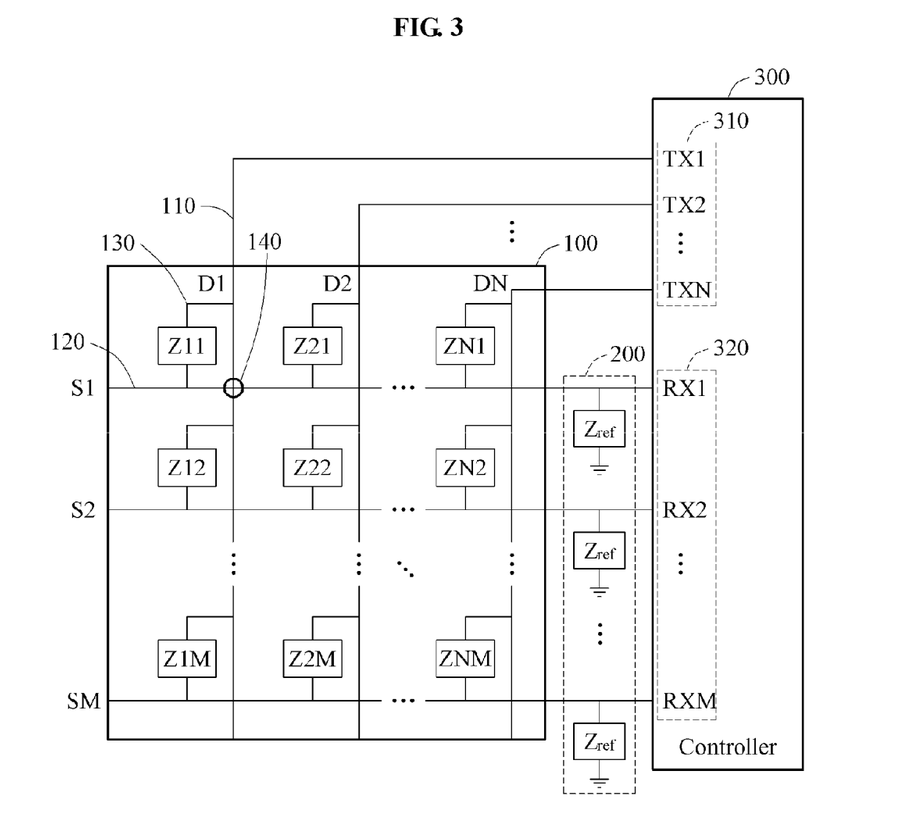
FIG. 3 illustrates a structure of a multi-touch apparatus according to an example embodiment.

FIG. 3 illustrates a structure of a multi-touch apparatus according to an example embodiment.

Referring to FIG. 3, the multi-touch apparatus includes the touch panel 100, the measuring impedance 200, and the controller 300.

The touch panel 100 includes the drive electrode 110, the sense electrode 120, and the impedance 130.

The drive electrode 110 may be connected to an output port 310 of the controller 300. The drive electrode 110 transfers a driving voltage from the output port 310 to the impedance 130 and the sense electrode 120. A plurality of drive electrodes 110 may be provided. For ease of description, N drive electrodes 110 are provided and the drive electrodes 110 are defined as D1 through DN. That is, N drive electrodes 110 are defined as Dn (1≤n≤N, N is a natural number). The drive electrodes D1 through DN may be connected to output ports TX1 through TXN, for example, the output port 310.

The sense electrode 120 may be connected to a general port 320 of the controller 300. The sense electrode 120 transfers a detection voltage associated with a change in an impedance value of the impedance 130 to the controller 300 through the general port 320. A plurality of sense electrodes 120 may be provided. For ease of description, M sense electrodes 120 are provided and the sense electrodes 120 are defined as S1 through SM. That is, M sense electrodes 120 are defined as Sm (1≤m≤M, M is a natural number). The sense electrodes S1 through SM may be connected to general ports RX1 through RXN, for example, the general port 320.

The impedance 130 is positioned at the cross point 140 of the drive electrode 110 and the sense electrode 120. The impedance value of the impedance 130 is changed based on a touch input of a user. The controller 300 may detect touch inputs associated with a plurality of cross points by measuring impedance values of impedances at the cross points.

The impedance 130 includes a resistor or a capacitor. In detail, the impedance 130 may include the resistor when a resistive sensing method is used. The impedance 130 may include the capacitor when a capacitive sensing method is used. For ease of description, an impedance positioned at a cross point of the drive electrode Dn and the sense electrode Sm is defined as Znm.

The measuring impedance 200 may be positioned between the sense electrode 120 and the general port 320. The controller 300 may measure a change in impedance occurring at a cross point using the measuring impedance 200.

The measuring impedance 200 may include a passive element only. For example, the measuring impedance 200 includes a resistor or a capacitor. Thus, the cost of producing the multi-touch apparatus of the present disclosure may be lower than that of the general multi-touch apparatus including an active element.

The controller 300 may detect the touch input of a user associated with the cross point 140. The controller 300 may select Dn and Sm, output a first voltage to Dn, output a second voltage to remaining drive electrodes excluding Dn from D1 through DN and remaining sense electrodes excluding Sm from S1 through SM, and detect the touch input associated with the cross point of Dn and Sm based on a detection voltage detected from Sm. Here, the controller 300 may convert a mode of a general port RXm to an analog-to-digital conversion (ADC) mode to detect the detection voltage.

For example, the controller 300 selects a first drive electrode from a plurality of drive electrodes, selects a first sense electrode from a plurality of sense electrodes, outputs a first voltage to the first drive electrode, outputs a second voltage to at least one of the remaining drive electrodes and at least one of the remaining sense electrodes, and detects a touch input associated with a first cross point of the first drive electrode and the first sense electrode based on a detection voltage detected from the first sense electrode.

Accuracy in detecting the touch input may be enhanced through the second voltage output to the remaining drive electrodes excluding Dn and the remaining sense electrodes excluding Sm. That is, the touch input of a user may be accurately detected and a ghost touch may not occur due to an output of the second voltage.

Here, the first voltage may be a digital high voltage and the second voltage may be a digital low voltage. Alternatively, the first voltage may be a digital pulse voltage and the second voltage may be a digital low voltage.

The digital pulse voltage may be applied when the impedance 130 includes a capacitor. The digital pulse voltage has a pulse cycle during which a remaining amount of power used to charge the capacitor during a positive pulse cycle is less than a predetermined level during a negative pulse cycle. In this case, the accuracy in detecting the touch input may be enhanced because the remaining amount of power used to charge the capacitor is removed. When the first voltage is the digital pulse voltage, the controller 300 may detect the touch input by measuring a maximum value of a detection power received during a predetermined period of time.

The controller 300 may determine a level of the touch input, in addition to whether a touch event occurs. The controller 300 may calculate a value of cross point impedance by removing an interference. The controller 300 may determine the level of the touch input based on the calculated value of cross point impedance. Detailed description of an operation of removing the interference will be provided with reference to FIG. 4.

Figure 4:
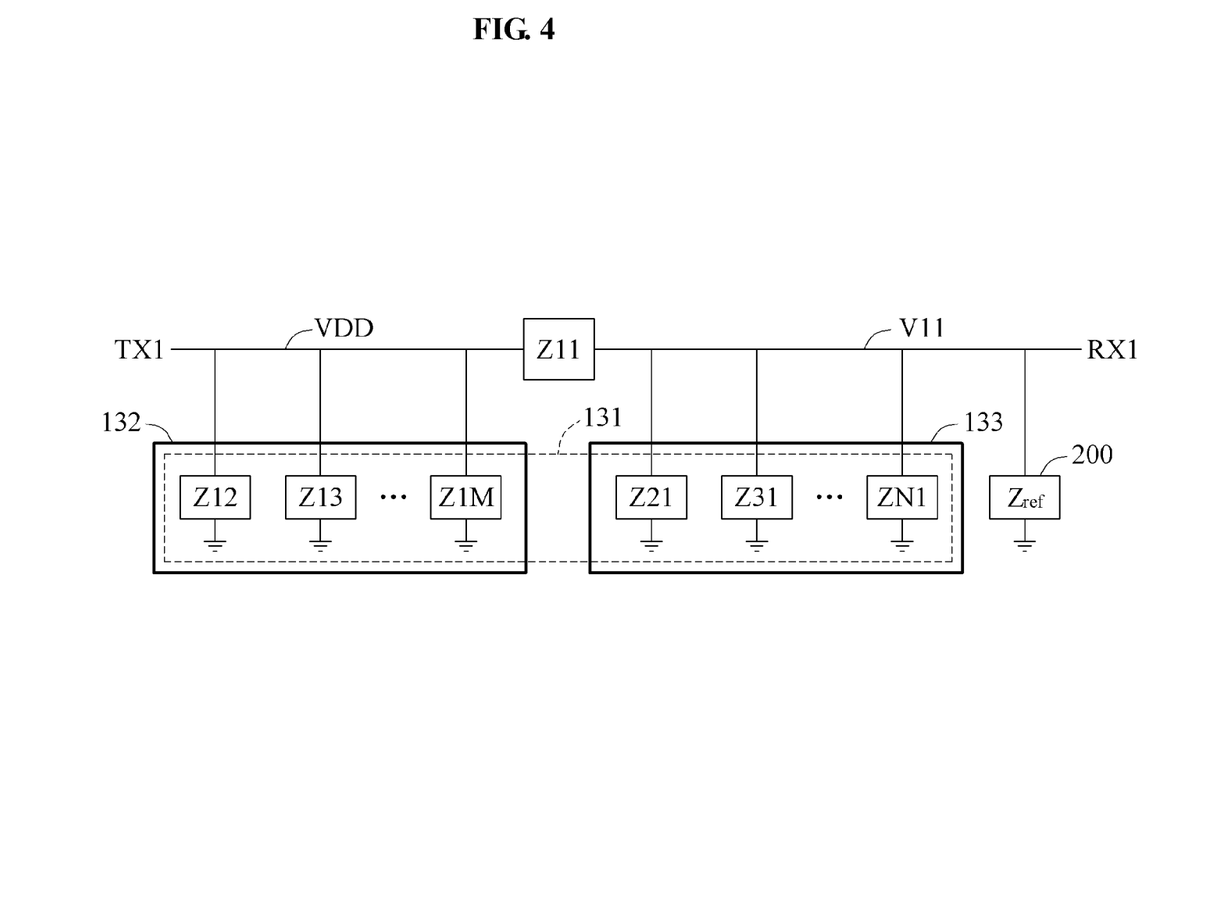
FIG. 4 illustrates an equivalent circuit based on a cross point impedance for describing an operation of removing an interference according to an example embodiment.

FIG. 4 illustrates an equivalent circuit based on a cross point impedance for describing an operation of removing an interference according to an example embodiment.

FIG. 4 illustrates the equivalent circuit illustrated in FIG. 3 based on a cross point impedance Z11. Z11 is connected to TX1 through D1 and connected to RX1 through S1. A voltage of D1 is a driving voltage VDD and a voltage of S1 is a detection voltage V11.

To detect an impedance of Z11, VDD is output to D1. When V11 is detected from S1, Z11 is affected by an interference impedance 131 including Z12 through Z1M and Z21 through ZN1. The interference impedance 131 includes interference impedances 132 positioned along a drive electrode including Z12 through Z1M and interference impedances 133 positioned along a sense electrode. Thus, an influence of the interference impedance 131 should be considered to measure an accurate impedance of Z11.

When Kirchhoff's law is applied with respect to RX1 in the equivalent circuit of FIG. 4, Equation 1 may be obtained.

$$\frac{VDD - V11}{Z11} = \frac{V11}{Z21} + \frac{V11}{Z31} + \ldots + \frac{V11}{ZN1} + \frac{V11}{Zref} \quad \text{[Equation 1]}$$

In Equation 1, VDD denotes the driving voltage, V11 denotes the detection voltage, and Zref denotes the measuring impedance 200. As described above, Zij (i=1, 2, ..., N, j=1, 2, ..., M) is an impedance positioned at a cross point of an i-th drive electrode and a j-th drive electrode. Here, N denotes a number of drive electrodes and M denotes a number of sense electrodes. Hereinafter, an identical parameter has a same meaning.

Similarly, when Kirchhoff's law is applied with respect to RX2 in an equivalent circuit for Z22, Equation 2 may be obtained.

$$\frac{VDD - V21}{Z21} = \frac{V21}{Z11} + \frac{V21}{Z31} + \ldots + \frac{V21}{ZN1} + \frac{V21}{Zref} \quad \text{[Equation 2]}$$

When a process of obtaining Equation 1 and Equation 2 with respect to Z11 through ZN1 is iteratively performed, a matrix of Equation 3 may be obtained and Equation 3 may be expressed as shown in Equation 4.

$$\begin{bmatrix} Vdd-V11 & -V11 & \ldots & -V11 \\ -V21 & Vdd-V21 & \ldots & -V21 \\ \vdots & \vdots & \ddots & \vdots \\ -VN1 & -VN1 & \ldots & Vdd-VN1 \end{bmatrix} \quad \text{[Equation 3]}$$

$$\begin{bmatrix} 1/Z11 \\ 1/Z21 \\ \vdots \\ 1/ZN1 \end{bmatrix} = \begin{bmatrix} V11/Zref \\ V21/Zref \\ \vdots \\ VN1/Zref \end{bmatrix}$$

$$\begin{bmatrix} 1/Z11 \\ 1/Z21 \\ \vdots \\ 1/ZN1 \end{bmatrix} = \begin{bmatrix} Vdd-V11 & -V11 & \ldots & -V11 \\ -V21 & Vdd-V21 & \ldots & -V21 \\ \vdots & \vdots & \ddots & \vdots \\ -VN1 & -VN1 & \ldots & Vdd-VN1 \end{bmatrix}^{-1} \quad \text{[Equation 4]}$$

$$\begin{bmatrix} V11/Zref \\ V21/Zref \\ \vdots \\ VN1/Zref \end{bmatrix}$$

The controller 300 may calculate a cross point impedance using Equation 4. Equation 4 may be expressed as shown in Equation 5. The controller 300 may use Equation 5 to simplify a matrix calculation process of Equation 4. When Equation 5 is used, an operation amount of the controller 300 may be reduced because an inverse matrix is not calculated. Thus, the controller 300 may accurately and rapidly detect the touch input.

$$Zi1 = \frac{Zref\left(Vdd - \sum_{k=1}^{N} Vk1\right)}{Vi1} \quad \text{[Equation 5]}$$

Equation 5, as generalized with respect to Zij, may be expressed as shown in Equation 6.

$$Zij = \frac{Zref\left(Vdd - \sum_{k=1}^{N} Vkj\right)}{Vij} \quad \text{[Equation 6]}$$

Equation 6 shows that an influence of the interference impedance 131 is removed using a difference between a driving voltage Vdd and a sum of voltages of the interference impedances 133 positioned along the sense electrode.

The controller 300 may use a digital value converted through an analog-to-digital converter (ADC) without using an analog value of the detection voltage as it is. An output value of the ADC may be expressed as shown in Equation 7.

$$Aij = \frac{Vij}{Vdd} A\max \quad \text{[Equation 7]}$$

In Equation 7, Amax denotes a maximum output value of the ADC and Aij denotes a digital value corresponding to Vij according to the ADC. When Equation 7 is applied to Equation 6, Equation 8 may be obtained.

$$Zij = \frac{Zref\left(A\max - \sum_{k=1}^{N} Akj\right)}{Aij} \quad \text{[Equation 8]}$$

Equation 8 shows that an influence of the interference impedances 131 is removed using a difference between the maximum output value of the ADC and a sum of analog digital conversion values corresponding to the voltages of the interference impedances 133 positioned along the sense electrode. The controller 300 may calculate an impedance value of the cross point impedance Zij from the digital value Aij of the detection voltage using Equation 8.

Equation 9 is expressed based on a digital value corresponding to a detection voltage of the general port 320.

$$Aij' = \frac{Aij}{Aij + A\max - \sum_{k=1}^{N} Akj} A\max \quad \text{[Equation 9]}$$

In Equation 9, Aij denotes the digital value corresponding to the detection voltage. The controller 300 may obtain a digital value Aij' by removing the influence of the interference impedances 131 from the digital value Aij using Equation 9. The controller 300 may calculate the cross point impedance Zij from the digital value Aij of the detection voltage using Equation 9.

Figure 5:
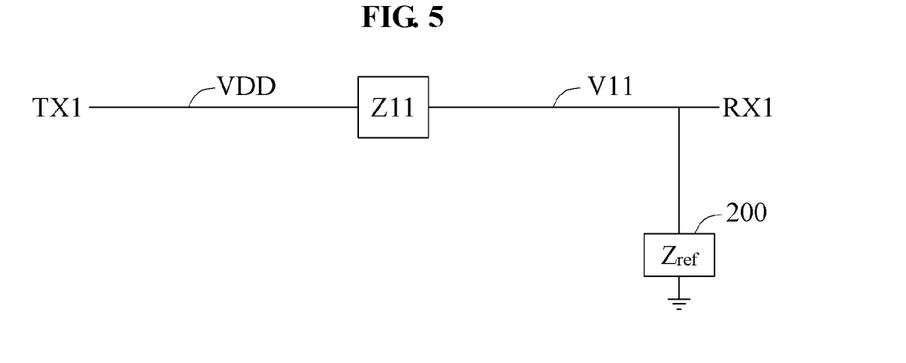
FIG. 5 illustrates an equivalent circuit based on a cross point impedance from which an interference is removed according to an example embodiment.

FIG. 5 illustrates an equivalent circuit based on a cross point impedance from which an interference is removed according to an example embodiment.

FIG. 5 illustrates a driving voltage VDD, a detection voltage V11, a cross point impedance Z11, and the measuring impedance 200. When an influence of the interference impedances 131 is removed using Equation 6, Equation 8, or Equation 9, the same effect of detecting an impedance value of the cross point impedance Z11 may be obtained in the equivalent circuit illustrated in FIG. 5.

Thus, an accurate impedance value of the cross point impedance Z11 may be known by measuring the detection voltage V11. The controller 300 (FIG. 3) may accurately detect a level of a touch input based on the impedance value of the cross point impedance Z11.

Figure 6:
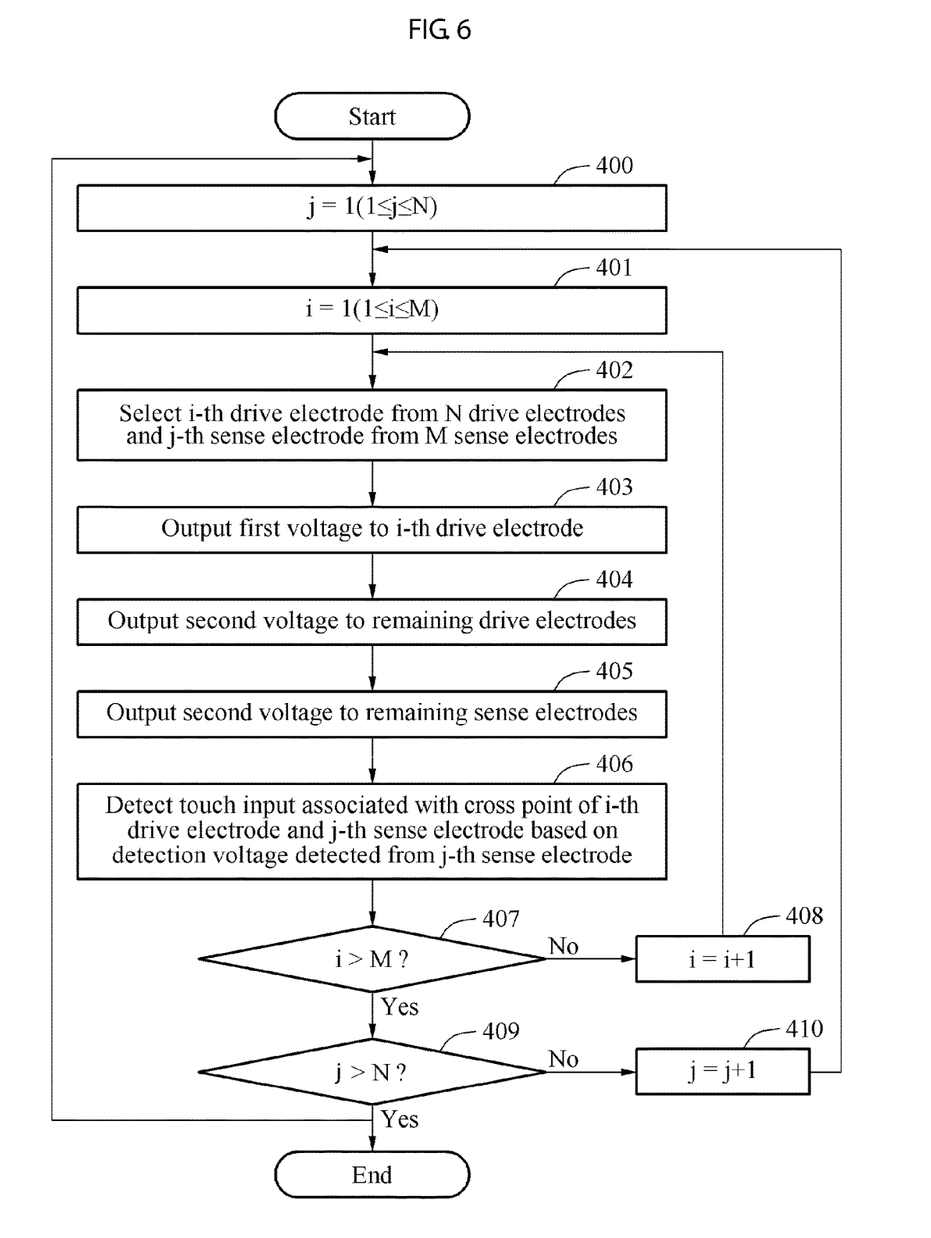
FIG. 6 is a flowchart illustrating an operating method of a multi-touch apparatus according to an example embodiment.

FIG. 6 is a flowchart illustrating an operating method of a multi-touch apparatus according to an example embodiment.

Referring to FIG. 6, in operation 400, the multi-touch apparatus sets a value j for selecting a sense electrode as 1. Here, j is a natural number greater than or equal to 1 and less than or equal to N. N denotes a total number of sense electrodes. N is a natural number.

In operation 401, the multi-touch apparatus sets a value i for selecting a drive electrode as 1. Here, i is a natural number greater than or equal to 1 and less than or equal to M. M denotes a total number of drive electrodes. M is a natural number.

In operation 402, the multi-touch apparatus selects an i-th drive electrode from N drive electrodes and a j-th sense electrode from M sense electrodes. That is, the multi-touch apparatus may select a first drive electrode from a plurality of drive electrodes and select a first sense electrode from a plurality of sense electrodes.

In operation 403, the multi-touch apparatus outputs a first voltage to the i-th drive electrode. That is, the multi-touch apparatus may output the first voltage to the first drive electrode. Here, the first voltage may be a digital high voltage or a digital pulse voltage.

The digital pulse voltage may be applied when an impedance includes a capacitor. The digital pulse voltage may have a pulse cycle during which a remaining amount of power used to charge the capacitor during a positive pulse cycle is less than a predetermined level during a negative pulse cycle. Thus, accuracy in detecting a touch input may be enhanced because the remaining amount of power used to charge the capacitor is removed. When the first voltage is the digital pulse voltage, a controller may detect the touch input by measuring a maximum value from a detection power received during a predetermined period of time.

In operation 404, the multi-touch apparatus outputs a second voltage to remaining drive electrodes excluding the i-th drive electrode from the N drive electrodes. That is, the second voltage may be output to at least one of the remaining drive electrodes. Here, the second voltage may be a digital low voltage.

In operation 405, the multi-touch apparatus outputs the second voltage to the remaining sense electrodes excluding the j-th sense electrode from the M sense electrodes. That is, the second voltage may be output to at least one of the remaining sense electrodes. Here, the second voltage may be a digital low voltage.

In operation 406, the multi-touch apparatus detects the touch input associated with a cross point of the i-th drive electrode and the j-th sense electrode based on a detection voltage detected from the j-th sense electrode. That is, the multi-touch apparatus may detect the touch input associated with a first cross point of the first drive electrode and the first sense electrode based on the detection voltage detected from the first sense electrode.

Also, in operation 406, the multi-touch apparatus may detect the touch input using N measuring impedances positioned between N sense electrodes and N general ports connected to the N sense electrodes. That is, the multi-touch apparatus may detect the touch input using a plurality of measuring impedances positioned between a plurality of sense electrodes and a plurality of general ports connected to the sense electrodes.

In addition, in operation 406, the multi-touch apparatus may measure an impedance value of a cross point impedance Zij positioned at a cross point of the i-th drive electrode and the j-th sense electrode by removing interference impedance occurring along the j-th sense electrode.

That is, the multi-touch apparatus may measure a value of a first impedance positioned at the first cross point by removing the interference impedance occurring along the first sense electrode. The multi-touch apparatus may remove the interference impedance using a difference between the first voltage and a sum of interference impedances positioned along the first sense electrode.

The multi-touch apparatus may use an output value of an analog-to-digital converter (ADC) described with respect to Equation 7 through Equation 9 to measure the impedance value of Zij.

In operation 407, the multi-touch apparatus compares i to M. When i is greater than M, the multi-touch apparatus performs operation 409. When i is not greater than M, the multi-touch apparatus performs operation 408.

In operation 408, the multi-touch apparatus increases i by 1 and performs operation 402 again.

In operation 409, the multi-touch apparatus compares j to N. When j is greater than N, the multi-touch apparatus performs operation 400. When j is not greater than N, the multi-touch apparatus performs operation 410.

In operation 410, the multi-touch apparatus increases j by 1 and performs operation 401 again.

Operations 400 through 410 may be continuously performed while the multi-touch apparatus detects the touch input. Also, because operations 400, 401, 407 through 410 relate to a scheme for iteratively detecting touch inputs associated with all cross points of a touch panel, the scheme related to operations 400, 401, 407 through 410 may be substituted with various schemes having a same effect or a similar effect.

The multi-touch apparatus may accurately detect a level of the touch input using a general controller and a passive element through operations 400 through 410. Because the multi-touch apparatus of the present disclosure does not use an on-demand controller or an active element, the cost of producing the multi-touch apparatus may be lower than that of the general multi-touch apparatus, and the multi-touch apparatus may accurately recognize a touch without a ghost touch and accurately detect the touch input.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blu-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the appended claims.

The invention claimed is:

1. A multi-touch apparatus comprising:
a plurality of drive electrodes;
a plurality of sense electrodes;
a plurality of impedances positioned at cross points of the drive electrodes and the sense electrodes; and
a controller configured to select a first drive electrode from the drive electrodes, select a first sense electrode from the sense electrodes, output a first voltage to the first drive electrode, output a second voltage to at least one of remaining drive electrodes and at least one of remaining sense electrodes, and detect a touch input associated with a first cross point of the first drive electrode and the first sense electrode based on a detection voltage detected from the first sense electrode,
wherein the controller is configured to measure an impedance value of a first impedance positioned at the first cross point among the impedances by removing interference impedance occurring along the first sense electrode, and
wherein the controller is configured to remove the interference impedance using a difference between the first voltage and a sum of voltages of interference impedances positioned along the first sense electrode.

2. The multi-touch apparatus of claim 1, further comprising:
a plurality of measuring impedances positioned between the sense electrodes and a plurality of general ports, wherein the controller is configured to detect the touch input using the measuring impedances.

3. The multi-touch apparatus of claim 1, wherein each of the impedances includes a resistor and the controller is configured to detect the touch input based on a change of a resistance value of the resistor of each of the impedances.

4. The multi-touch apparatus of claim 1, wherein each of the impedances includes a capacitor and the controller is configured to detect the touch input associated with the first cross point based on a change of a capacitance value of the capacitor of each of the impedances.

5. The multi-touch apparatus of claim 1, wherein the first voltage is a digital high voltage and the second voltage is a digital low voltage.

6. The multi-touch apparatus of claim 1, wherein the first voltage is a digital pulse voltage and the second voltage is a digital low voltage.

7. The multi-touch apparatus of claim 6, wherein each of the impedances includes a capacitor and the digital pulse voltage has a pulse cycle during which a remaining amount of power used to charge the capacitor during a positive pulse cycle of the digital pulse voltage is less than a predetermined level during a negative pulse cycle.

8. A control apparatus for a multi-touch panel, the apparatus comprising:
N output ports connected to N drive electrodes of the multi-touch panel;
M general ports connected to M sense electrodes of the multi-touch panel; and
a processor configured to select a first output port from the N output ports, select a first general port from the M general ports, output a first voltage to the first output port, output a second voltage to at least one of remaining output ports and at least one of remaining general ports, and detect a touch input associated with a first cross point of a first drive electrode among the N drive electrodes and a first sense electrode among the M sense electrodes based on a detection voltage detected from the first general port, the first drive electrode connected to the first output port and the first sense electrode connected to the first general port,
wherein the processor is configured to measure an impedance value of the first cross point by removing interference impedance occurring along the first sense electrode,
wherein the processor is configured to remove the interference impedance using a difference between the first voltage and a sum of voltages of interference impedances positioned along the first sense electrode, and
wherein M and N are natural numbers.

9. The control apparatus of claim 8, wherein the processor is configured to remove the interference impedance using a difference between a maximum output value of an analog-to-digital converter (ADC) and a sum of analog-to-digital conversion values corresponding to voltages of interference impedances positioned along the first sense electrode.

10. A method of operating a multi-touch apparatus, the method comprising:
selecting a first drive electrode from a plurality of drive electrodes and selecting a first sense electrode from a plurality of sense electrodes;
outputting a first voltage to the first drive electrode;
outputting a second voltage to at least one of remaining drive electrodes;
outputting the second voltage to at least one of remaining sense electrodes; and
detecting a touch input associated with a first cross point of the first drive electrode and the first sense electrode based on a detection voltage detected from the first sense electrode,
wherein the detecting of the touch input comprises measuring an impedance value of a first impedance positioned at the first cross point by removing interference impedance occurring along the first sense electrode, and
wherein the measuring the impedance value of the first impedance comprises removing the interference impedance using a difference between the first voltage and a sum of voltages of interference impedances positioned along the first sense electrode.

11. The method of claim 10, wherein the detecting of the touch input based on the detection voltage comprises detecting the touch input using a plurality of measuring impedances positioned between the sense electrodes and a plurality of general ports connected to the sense electrodes.

* * * * *